June 18, 1935.  W. S. GRAHAM  2,005,618
TRACTOR CULTIVATOR
Filed Oct. 18, 1934    3 Sheets-Sheet 2
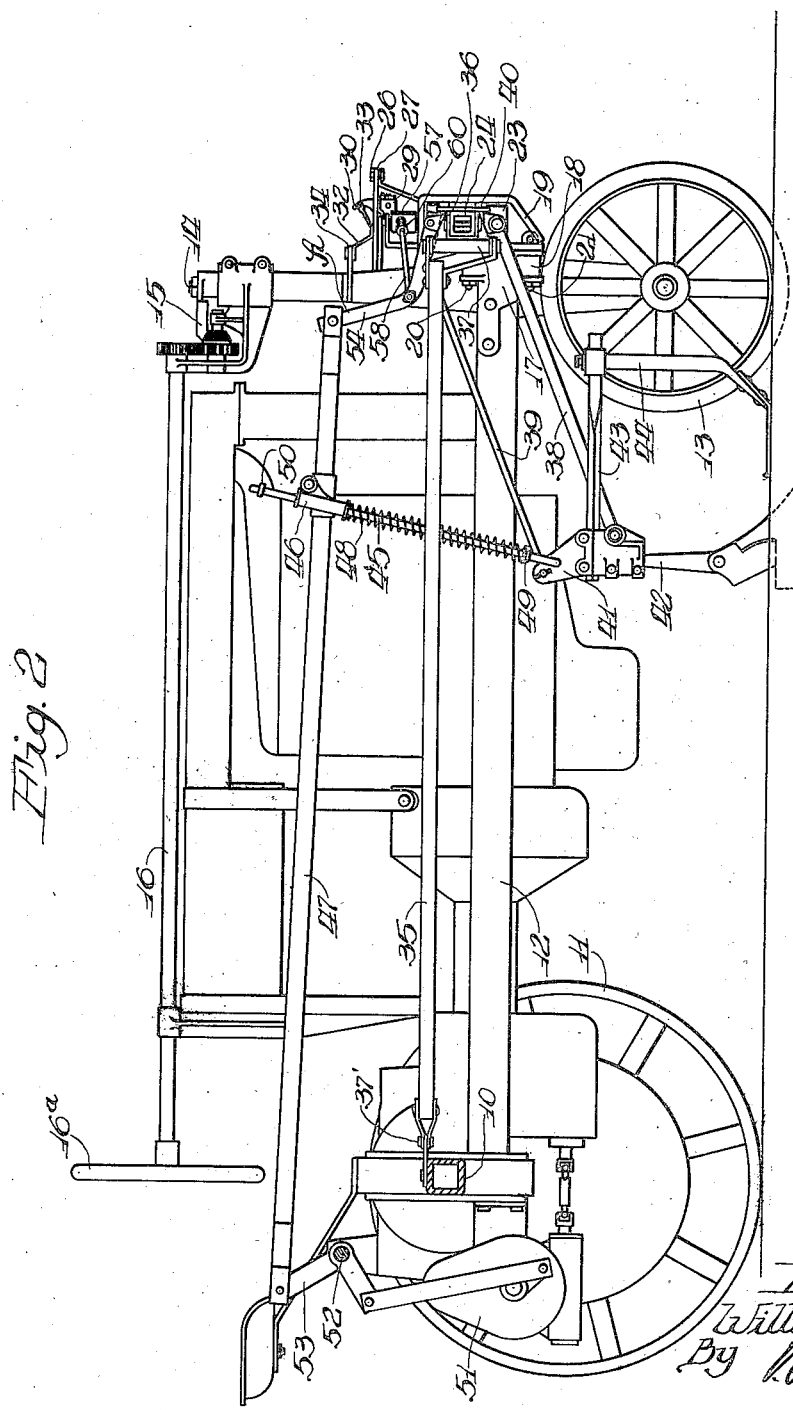

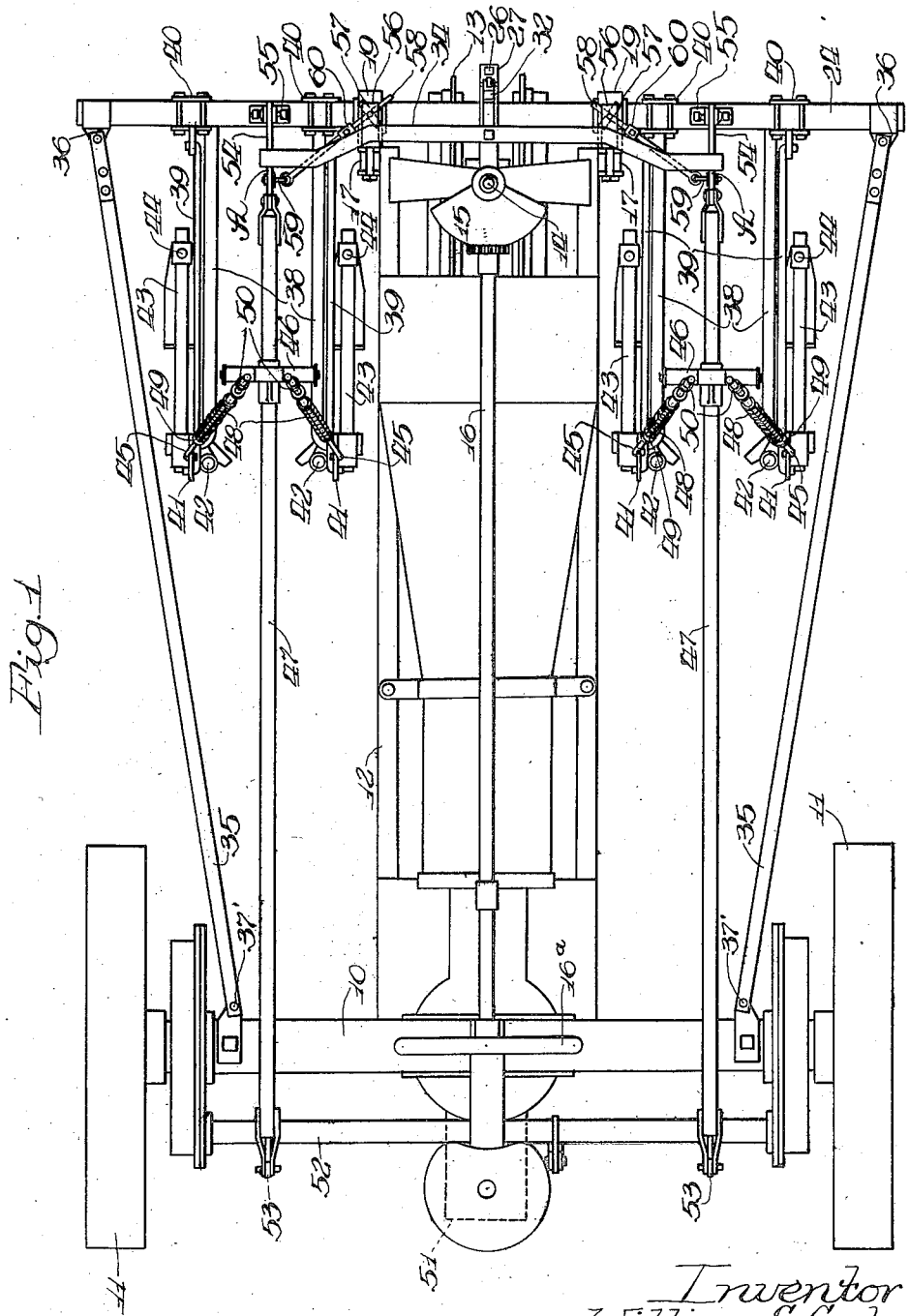

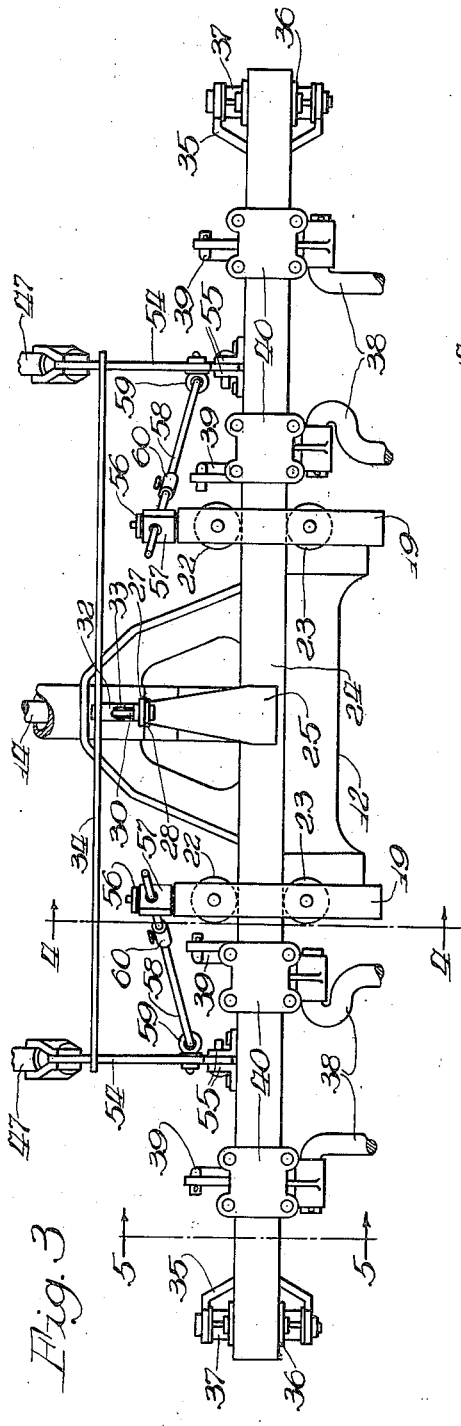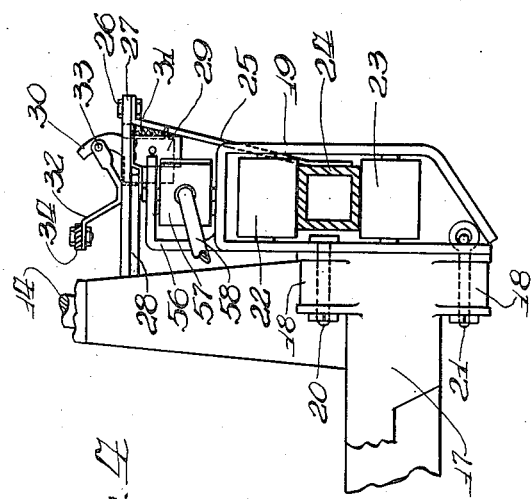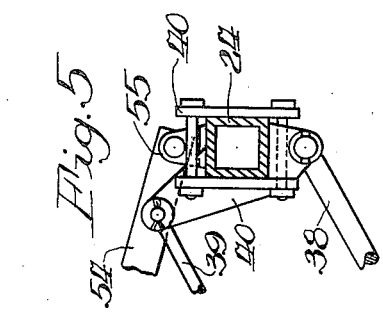

Patented June 18, 1935

2,005,618

UNITED STATES PATENT OFFICE 2,005,618

TRACTOR CULTIVATOR

William S. Graham, Canton, Ill., assignor to International Harvester Company, a corporation of New Jersey Application October 18, 1934, Serial No. 748,798

11 Claims. (Cl. 97—47)

The invention herein disclosed relates to tractor cultivators and, more particularly, to front end cultivator attachments for tractors of the row crop type.

The invention disclosed is an improvement to the tractor cultivators as set forth in the United States Patents No. 1,718,773 granted to B. R. Benjamin, June 25, 1929, and No. 1,936,749 granted to S. W. Cady et al., Nov. 28, 1933.

The principal object of the invention is to provide a structure which will limit the lateral movement of the gang bar either to the right or to the left when the tractor cultivator is being used on side hill cultivation, and another object of the invention is to automatically center the gang bar upon raising either of the cultivator gangs. The raising of the gangs may be accomplished by hand or by the use of power from the tractor.

The aforesaid improvement is applied to a light and structurally simple cultivator attachment for use in combination with row-crop tractors, which embodies novel means for supporting the cultivating tools on the tractor, so that they may be given substantially rectilinear shifting movement laterally for plant dodging purposes. The cultivator attachment also embodies tool supporting and lifting means in the attachment, which will maintain the tools in level or horizontal position during vertical movement thereof.

Other objects and advantages will appear from the detailed description of the preferred embodiment of the invention hereinafter given in connection with the accompanying drawings, where:

Figure 1 is a plan view of a tractor cultivator embodying the invention;

Figure 2 is a side elevation embodying the invention with the rear axle of the tractor in section;

Figure 3 is a front view on an enlarged scale, showing the main or transverse member for supporting the cultivator attachment with the improvement attached.

Figure 4 is a detail sectional view on the line 4—4 of Figure 3; and,

Figure 5 is a detail sectional view on the line 5—5 of Figure 3.

In its present embodiment, the invention is shown in combination with a row crop tractor of the type comprising a wide tread rear axle structure 10 supported on traction wheels 11 and having a central, longitudinal body 12 supported at the front on a dirigible, narrow tread truck 13. The truck is swiveled on the forward end of the body by means of an upright standard 14 journaled in the front crosshead on casting of the body and carrying a gear section 15 at its upper end, connected through suitable gearing with the steering shaft 16 which extends to the rear of the tractor to the steering wheel 16ª. At each side of its front end, the tractor body is provided with brackets 17 formed with vertically spaced sockets 18 for the reception of the fastening means which support the bearing brackets 19 in which the cultivating attachment to be described is carried. These bearing brackets 19 are preferably formed of a flat bar bent into oblong, rectangular shape, as best seen in Figure 4, and bolted to the brackets 17 by the upper and lower bolts 20 and 21. Each of the supporting brackets formed by the bars 19 carries vertically spaced cylindrical rollers 22 and 23. These rollers are spaced the required distance apart to receive between them a transversely extended member or bar 24, which is here disclosed as tubular, but may, of course, be of any shape desired. This member 24 projects beyond each side of the tractor body to overhang the plant row at each side thereof at its center, and has welded or otherwise secured to it an upright arm 25, which is pivotally connected at its upper end, as by a bolt 26, with a forwardly extending arm 27 projecting from the standard 14 of the truck and rotatable thereon.

Immediately below the arm 27 the standard of the truck has fixed to it a shorter, forwardly extending arm 28, which terminates adjacent the rear end of a longitudinally extending slot in the arm 27. Below this slot the arm 27 is provided with a depending bracket 29 which serves as a point of pivotal support for an upwardly extending latch member 30 projecting through the slot in the arm 27. The latch member 30 is impelled rearwardly towards the end of the arm 28 by a suitable coil spring 31 and the end of the arm 28 is provided with a notch for seating the pawl when the arms 27 and 28 are parallel. The arm and latch construction and arrangement just described are substantially that shown in greater detail in the patent to Benjamin et al. No. 1,667,371 of April 24, 1928. As means for operating the latch to lock and release the arm 27 from the arm 28, there is provided a rearwardly extending arm 32, which has a runner portion resting on the arm 27, which is pivoted at its forward end, as at 33, to the upper end of the latch 30. At its rear end the arm 32 extends upwardly and carries a crossbar 34, as best seen in Figures 1 and 3, the purpose of which will be later referred to. At each side of the tractor body, the cross member 24 is connected to a rearwardly extending thrust bar 35, which is connected to an outwardly spaced point on the cross member 24 by means of a vertical pivot bracket 36.

The pivot bracket is formed with a vertically elongated bearing sleeve 37, which receives a pivot pin on the forward end of the thrust member 35. Each bar 35 extends rearwardly and inwardly and is pivoted at its rear end to the axle structure of the tractor by means of a vertical bearing pin, at 37'. Accordingly, thrust bars permit axial movement of the transverse member 24 between the bearing rollers 22 and 23, which are of sufficient length to permit the slight arcuate movement necessitated during the movement of the member, which is loosely seated between the bearing rollers. The member 24 is, however, held against rotation by the elongated bearing at 37, and also because the bar 24 has a square cross section.

Each of the projecting ends of the transverse member 24 supports a straddle-row cultivating unit, and, as they are identical at each side of the tractor, only one of them will be described. Each straddle-row unit is composed of two tool supporting rigs, and each rig consists of a lower or main dragbar 38 and an upper parallel drag link 39. The forward ends of both members 38 and 39 are pivotally mounted in a bracket 40, which is securely fastened to the transverse member 24, as best shown in Figure 5. The parallel dragbars 38 and 39 are connected at their rear ends by a tool bracket 41 formed with a vertical socket for the reception of the shovel standard 42 and with a horizontal fore and aft socket extending therethrough for reception of the forwardly extending arm 43, on the forward end of which the standard 44 of a ground engaging gauge member is mounted. The foregoing arrangement of parallel dragbars pivotally connected by the tool bracket 41 provides a substantially rectilinear, pivotally connected linkage, which maintains the tools and the ground engaging gauge member in substantially horizontal level position during vertical movement of the cultivation rig. In order to effect lifting and lowering of each rig and to maintain it in ground engaging position, each tool bracket 41 is provided with a lifting link 45, which is pivotally connected to the tool bracket at a point between the two dragbars 38 and 39. At its upper end the link 45 passes through a suitable collar bracket 46 securely attached to the forwardly extending lift actuating bar 47. The bracket 46 in this modification is capable of receiving two lifting links 45. The usual pressure spring 48 is confined on the link 45 between the collar on the collar bracket 46 and a stop 49 on the lower end of the link. Another stop 50 is provided at the upper end of the link 45, with which the collar on the collar bracket 46 will contact when the forwardly extending lift actuating bar 47 is moved upwardly and forwardly, thereby lifting the cultivator rigs from the ground.

The raising and lowering of the cultivator rigs is preferably effected by means of power lift mechanism on the rear end of the tractor, as at 51, though it is to be understood that this power lift mechanism of the half revolution type may be located elsewhere on the tractor. It is also to be understood that the power lift mechanism may be supplanted by the ordinary lever and quadrant, if so desired. The power lift mechanism 51 actuates crank and link mechanism to swing a rockshaft 52 carrying crank arms 53 firmly attached thereto, to which the forwardly extending lift actuating bars 47 are pivotally connected at their rear ends. These bars 47 are pivotally connected at their front ends to links 54 which are pivotally mounted in brackets 55 which are firmly affixed to the transverse member 24. The cultivator rigs, since they are attached to the lift actuating bars 47, are raised or lowered upon the actuation of the power lift mechanism 51 at the will of the operator.

In order to prevent excessive axial movement of the transverse member 24 in side hill cultivation and at the same time to provide for automatic centering of the transverse member upon the raising of the cultivator rigs, the roller carrying brackets 19 at each side of the tractor frame may be provided with upper supporting brackets 56 pivotally supporting guide brackets 57 provided with holes for the centering rods 58 to slide thereon. The upper part of the brackets 19 are provided with holes for the lower pivots of the brackets 57. The centering rods are provided with eyes at the rear end, which pivot in the eye bolts 59, which are firmly attached to the pivoted links 54. Adjustable stops 60 are mounted on the centering rods 58. These stops 60 abut against the pivoted guide brackets 57, thereby limiting the movement of the transverse member 24 to the right or left and also, when the cultivating rigs are raised, aid in centering the transverse member.

In operation, the member 24 carrying the straddle-row cultivator units is connected to the standard of the steering truck through the arms 25, 27 and 28 and the interposed latch 30, and steering movements of the truck will cause axial shifting of the member 24 to impart plant dodging movements to the cultivator units. If the operator is using this cultivating device in side hill work, the stops 60 mounted on the centering rod guide brackets prevent the transverse member 24 from moving either to the right or left too far, depending upon direction of the tractor along the hillside being cultivated.

In order to center the transverse member 24 by the raising of the cultivator rigs, the operator trips the power lift 51, which imparts an upwardly and forward movement to the lift actuating bars 47, pivoted to the transverse member 24 through the pivoted links 54, which abut the crossbar 34 at A, best shown in Figures 1 and 2. The bar 34 releases the latch 30 through the extending arm 32 sliding on the forwardly extending arm 27. Releasing the latch 30 from the arm 28, which is connected to steering standard 14, permits the operator to make short turns at the headlands of the rows being cultivated.

As the transverse member 24 is disconnected from the steering mechanism, the centering rods 58, which are connected to the pivoted links 54, which in turn are connected to the transverse member 24, are brought into engagement through the stops 60 with the guide brackets 57, which are mounted in the brackets 19 and 56, which are mounted on the frame of the tractor 12. The result is that the transverse member 24 is centered with respect to the tractor frame 12 and also is prevented from having too great a lateral movement in either direction when transporting.

The foregoing construction is, therefore, one in which comparatively few parts are employed and in which there is afforded a directly connected type of cultivator attachment having rectilinear shifting movement as well as parallel lift mechanism, all carried on one main supporting member, the bar 24. In addition the construction provides for means to limit the shifting movement of the bar and also automatic means for centering the bar upon the raising of the cultivator rigs.

The preferred embodiment of the invention above described may be subject to variations in details of construction without departure from the scope of the invention as defined in the following claims.

What is claimed is:

1. The combination of a tractor having fixed supporting means extending forwardly on the front end of the tractor, a transversely extending member loosely carried on said supporting means for translative movement horizontally with respect thereto and projecting beyond each side of the tractor, means on the tractor for shifting said member axially, a thrust member connected to each projecting portion of the transverse member by a vertical pivot and similarly connected to the rear portion of the tractor, tillage tools having dragbars trailing from the projecting portions of the transverse member, and means whereby the horizontal translative movement of the transverse member is limited.

2. The combination of claim 1, the vertical pivot between each thrust member and the transverse member being mounted in elongated bearings to prevent rotation of the transverse member.

3. The combination of a tractor having bearing brackets mounted on the forward portion of the tractor in lateral spaced relation, a transversely extending member loosely mounted in the brackets for movement axially and projecting beyond each side of the tractor, means on the tractor for shifting said member axially, a thrust member connected to each projecting portion of the transverse member by a vertical pivot and similarly connected to the rear portion of the tractor, tillage tools having dragbars pivotally supported on the projecting portions of the transverse member for movement vertically, means carried by said portions of the transverse member for lifting and lowering the dragbars, and centering means whereby said transverse member is centered upon the raising of said tillage tools.

4. The combination of a tractor having fixed supporting brackets mounted on the forward end thereof, a pair of bearing rollers mounted in each bracket in vertically spaced relation, a transversely extending member positioned between the bearing rollers and supported thereby for free movement axially, means on the tractor for shifting the transverse member axially, vertically movable tillage tools mounted on the transverse member, means pivoted to the transverse member for moving the tools vertically, and adjustable means for limiting the axial movement of the transverse member.

5. The combination of a tractor having bearing brackets mounted on the forward portion of the tractor in laterally spaced relation, rollers mounted in said brackets, a transversely extending member mounted in bearings on the brackets for movement axially and projecting beyond the tractor body, means on the tractor for shifting said member axially, forwardly extending lift actuating bars, means for pivotally connecting said lift bars to said transverse member, means on the tractor for actuating said lift bars, vertically spaced dragbars pivoted to the transverse member and trailing rearwardly therefrom, tool brackets pivotally connecting the free ends of said dragbars, lifting links connecting said brackets to the lift actuating bars, soil working means secured to the brackets, means for disengaging said transverse member from said axially shifting means, and centering means whereby said transverse member is centered with respect to the tractor upon the operation of said means for actuating said lift bars.

6. The combination of a tractor having a transverse member mounted on the forward portion of the tractor and projecting laterally therefrom, lift actuating bars, means for connecting said lift bars to said transverse member, power lift means of the one-half revolution type clutch operated by said tractor for actuating said lift bars, vertically spaced parallel dragbars pivoted to the transverse member for movement vertically, a tool bracket pivotally connecting the free ends of said dragbars, a lifting link connecting the bracket to the lift actuating bars, soil working means secured to the bracket, and centering means connecting said lift actuating bars whereby said transverse member is centered with respect to the tractor upon the raising of said dragbars.

7. The combination of a tractor having fixed supporting brackets, spaced bearing means permitting translative movement mounted therein, a transverse extending member mounted in said bearing means, means on the tractor for shifting said transverse member laterally when said tractor is steered, tillage tools having dragbars pivotally supported on said transverse member, means for raising and lowering said tillage tools, said means including forwardly extending lift actuating bars, adjustable means for actuating said lift bars and pivoted links connecting said lift bars to said transverse member, means for releasing said steering means from said transverse member, said releasing means operable by the movement of said raising and lowering means, and means for centering said transverse member by said raising and lowering means.

8. The combination of a tractor having fixed supporting brackets, spaced bearing means permitting translative movement mounted therein, a transversely extending member mounted in said bearing means, means on the tractor for shifting said transverse member laterally when said tractor is steered, tillage tools having dragbars pivotally supported on said transverse member, means for raising and lowering said tillage tools, said means including forwardly extending lift actuating bars, adjustable means for actuating said lift bars and pivoted links connecting said lift bars to said transverse member, means for releasing said steering means from said transverse member, said releasing means operable by the movement of said raising and lowering means, and means for centering said transverse member by said raising and lowering means, said centering means including centering rods pivoted to said pivoted links, adjustable limiting means mounted on said rods, supporting brackets mounted on said tractor, guide brackets pivotally mounted in said last mentioned brackets, said guide brackets permitting the sliding therethrough of said centering rods and the abutting of said limiting means.

9. The combination of a tractor having fixed supporting brackets, spaced bearing means permitting translative movement mounted therein, a transversely extending member mounted in said bearing means, means on the tractor for shifting said transverse member laterally when said tractor is steered, a thrust member connected to each projecting portion of the transverse member by a vertical pivot and similarly connected to the rear portion of the tractor, tillage tools having dragbars pivotally supported on said transverse member, means for raising and lowering said tillage tools, said means including forwardly extending lift actuating bars, adjustable means for actuating said lift bars and pivoted links connecting said lift bars to said transverse member, means for releasing said steering means from said transverse member, said releasing means operable by the movement of said raising and lowering means, and adjustable limiting means for limiting the lateral movement of said transverse means.

10. In a cultivator attachment for a tractor of the tricycle type having fixed supports for attaching said attachment on the forward portion of said tractor and means for steering the implement attachment, said cultivator attachment including supporting brackets to attach to said tractor brackets, said last mentioned brackets having spaced bearing means permitting translative movement mounted therein, a transversely extending member mounted in said bearing means, means mounted on said transverse member for releasably connecting said transverse member to said implement steering means, tillage tools having dragbars pivotally supported to said transverse member, means for raising and lowering said tillage tools, said means including forwardly extending lift actuating bars, adjustable means for actuating said lift bars, and pivoted links connecting said lift bars to said transverse member; means for releasing said steering means from said transverse member, said releasing means operable by the movement of said raising and lowering means, and means for centering said transverse member by said raising and lowering means.

11. In an attachment as set forth in claim 10, said centering means including centering rods pivoted to said pivoted links, adjustable limiting means mounted on said rods, supporting brackets mounted on said cultivator attaching brackets, guide brackets pivotally mounted in said supporting brackets, and said guide brackets permitting the sliding therethrough of said centering rods and the abutting of said limiting means.

WILLIAM S. GRAHAM.